United States Patent
Schmier-II et al.

(10) Patent No.: US 9,770,764 B1
(45) Date of Patent: Sep. 26, 2017

(54) CLAMP HAVING HINGED JAWS

(75) Inventors: Mark A. Schmier-II, Mesa, AZ (US); Paul J. Strand, Mesa, AZ (US); Jon M. Bourland, II, Mesa, AZ (US); Rodney A. Benton, Mesa, AZ (US); Carl R. Allred, San Tan Valley, AZ (US); Ronald G. Wesp, Gilbert, AZ (US)

(73) Assignee: The Boeing Company, Chicago, IL (US)

(*) Notice: Subject to any disclaimer, the term of this patent is extended or adjusted under 35 U.S.C. 154(b) by 828 days.

(21) Appl. No.: 13/327,878

(22) Filed: Dec. 16, 2011

(51) Int. Cl.
*B23B 47/28* (2006.01)
*B23B 49/00* (2006.01)

(52) U.S. Cl.
CPC .............. *B23B 47/28* (2013.01); *B23B 49/00* (2013.01); *Y10T 408/563* (2015.01); *Y10T 408/567* (2015.01); *Y10T 408/56245* (2015.01)

(58) Field of Classification Search
USPC ........................................ 408/115 R, 103, 97
See application file for complete search history.

(56) References Cited

U.S. PATENT DOCUMENTS

| | | | |
|---|---|---|---|
| 1,110,528 A * | 9/1914 | Borresen | 7/101 |
| 1,607,929 A * | 11/1926 | Waters | 81/55 |
| 2,181,746 A | 11/1939 | Siebrandt | |
| 2,351,243 A * | 6/1944 | Vetter | 408/97 |
| 2,439,501 A * | 4/1948 | Yelkin | 29/235 |
| 2,644,648 A * | 7/1953 | Geraci | 242/235 |
| 2,669,889 A * | 2/1954 | Huller | 408/22 |
| 2,674,907 A * | 4/1954 | Zoll | 408/79 |
| 2,861,484 A * | 11/1958 | Rance | 408/115 R |
| 3,049,031 A * | 8/1962 | Carstens | 408/76 |
| 3,108,500 A * | 10/1963 | Merriman | 408/241 R |
| 3,386,318 A * | 6/1968 | Pekarcik et al. | 408/97 |
| 3,739,662 A | 6/1973 | Windelman et al. | |
| 3,823,462 A * | 7/1974 | Kanda | 29/268 |
| 4,194,861 A * | 3/1980 | Keller | 408/109 |
| 4,445,264 A * | 5/1984 | Banerian | 29/445 |
| 4,514,120 A * | 4/1985 | Hougen | 409/137 |
| 4,601,618 A | 7/1986 | McEldowney | |
| 4,747,588 A * | 5/1988 | Dillhoff | 269/6 |
| 5,143,359 A * | 9/1992 | Bush | 269/6 |
| 5,163,792 A | 11/1992 | Slavik | |
| 5,322,396 A * | 6/1994 | Blacker | 408/72 R |
| 5,630,683 A * | 5/1997 | Smith | 408/67 |
| 5,676,500 A * | 10/1997 | Sommerfeld | 408/103 |
| 5,730,560 A * | 3/1998 | Marcelloni | 408/72 B |
| 5,733,077 A * | 3/1998 | MacIntosh, Jr. | 408/103 |
| 5,800,099 A * | 9/1998 | Cooper | 408/1 R |
| 6,000,686 A * | 12/1999 | Yates | 269/6 |
| 6,276,039 B1 * | 8/2001 | Barnes | 29/402.05 |
| 6,327,944 B1 * | 12/2001 | Liao | 81/418 |
| 2006/0285931 A1 * | 12/2006 | Dean | 408/103 |

FOREIGN PATENT DOCUMENTS

GB   2288356 A  * 10/1995

* cited by examiner

*Primary Examiner* — Daniel Howell
*Assistant Examiner* — Nicole N Ramos
(74) *Attorney, Agent, or Firm* — Miller, Matthias & Hull LLP

(57) ABSTRACT

A clamp comprises first and second jaws that provide contact surfaces. The first jaw is elongated and has a longitudinal bore. The jaws are transversely hinged to maintain bore perpendicularity.

20 Claims, 5 Drawing Sheets

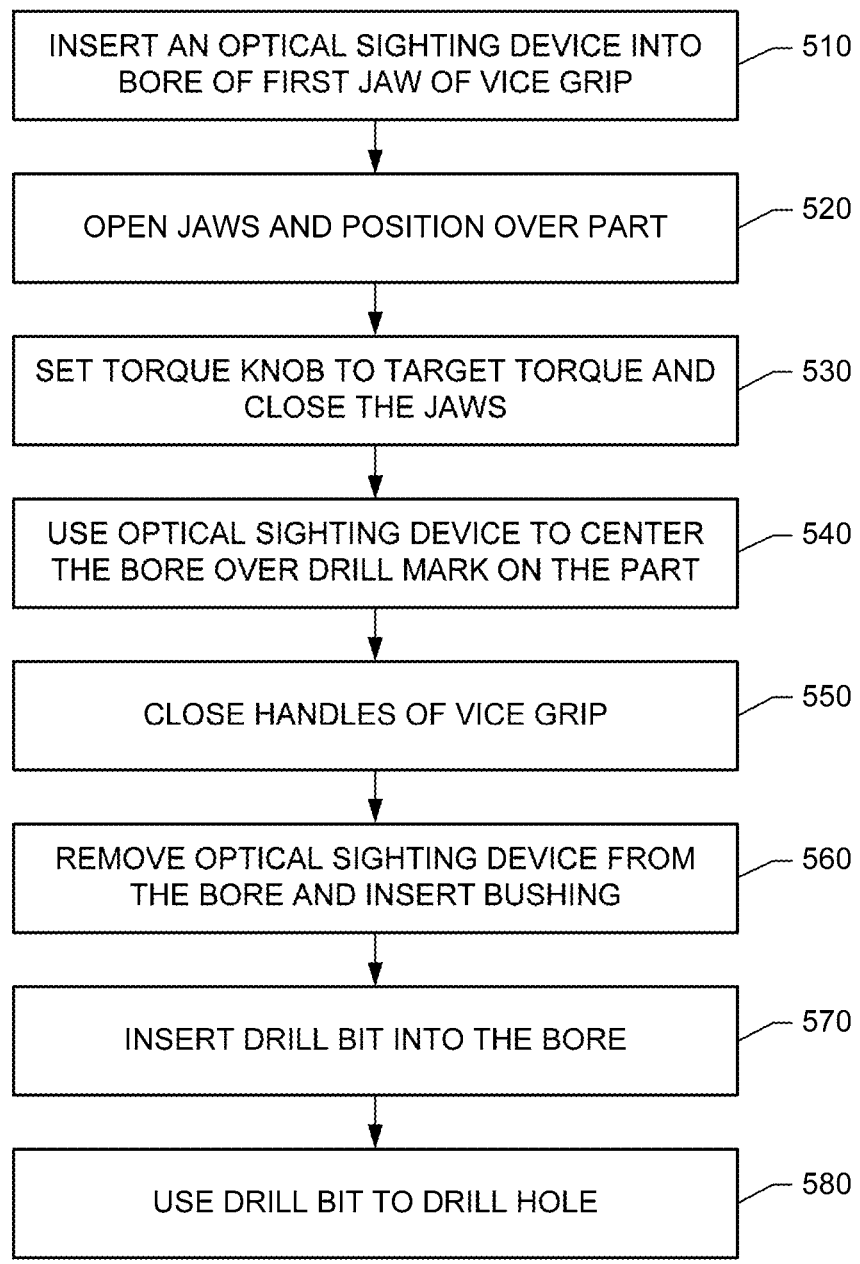

CLAMP HAVING HINGED JAWS

BACKGROUND

Composites are attractive to the aerospace industry because of their high strength, high rigidity, and low weight. Weight reduction in an aircraft is highly desirable, as it reduces aircraft operating costs, increases airframe performance capabilities, and reduces the incidence of maintenance for aircraft owners and operators.

Thin composite parts may be used in airframe structures, subcomponents, covers and radomes. During fabrication and assembly, holes may be drilled in the thin composite parts.

Hand drilling of relatively thin composite parts is difficult to perform. If the drilling is not precise, parts can be chipped. Splintering and delaminations can also occur. Chipped, splintered and delaminated parts are often scrapped.

Drilling accuracy can be difficult to maintain, even if drill markings are accurately indicated on a part. Drilling accuracy is important, especially for aerospace parts.

There is a need for a drill guide that can assist with precise hand drilling of thin composite parts.

SUMMARY

According to an embodiment herein, a clamp comprises first and second jaws that provide contact surfaces. The first jaw is elongated and has a longitudinal bore. The jaws are transversely hinged to maintain bore perpendicularity.

According to another embodiment herein, a drill guide comprises a vice grip with first and second arms, and first and second cylindrical jaws transversely hinged to the first and second arms. Opposing ends of the jaws provide sole contact surfaces. The first cylindrical jaw also has a longitudinal bore.

According to another embodiment herein, a method of drilling a thin composite part having opposing surfaces comprises clamping the part with clamp jaws that are pivotable, while ensuring that a longitudinal internal bore in one of the jaws is perpendicular to the surfaces of the part. The method further comprises inserting a drill bit in the bore, and using the drill bit to create a hole in the part.

These features and functions may be achieved independently in various embodiments or may be combined in other embodiments. Further details of the embodiments can be seen with reference to the following description and drawings.

BRIEF DESCRIPTION OF THE DRAWINGS

FIG. 5 is an illustration of a method of using the clamp to perform hand drilling of a thin composite part.

DETAILED DESCRIPTION

Figure 1:
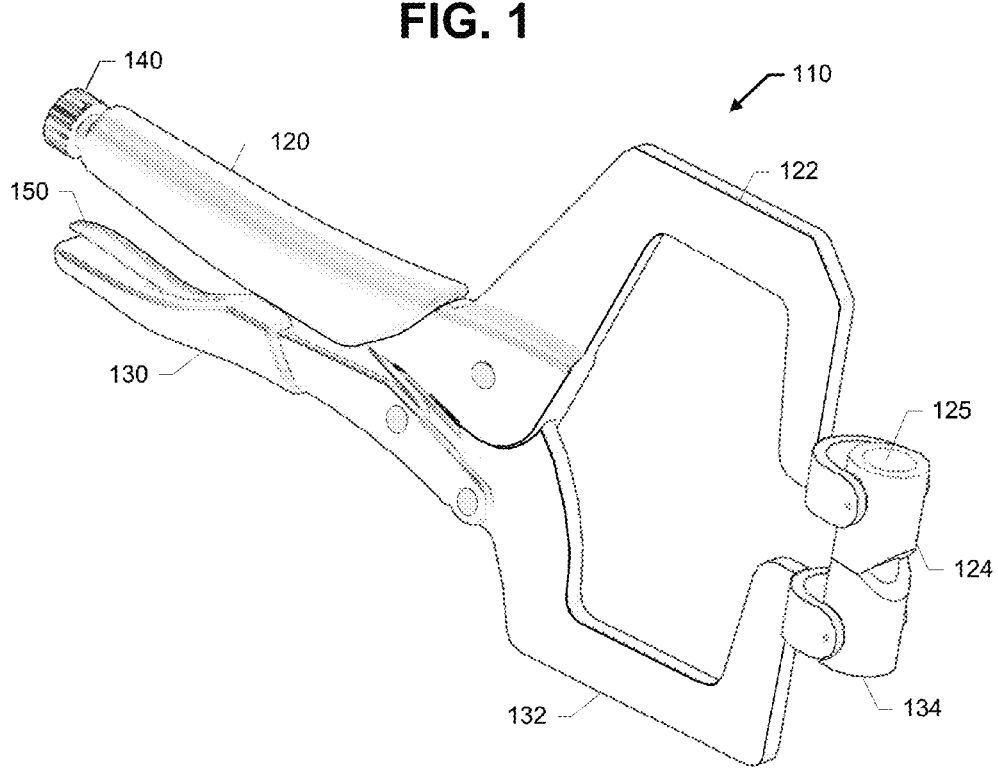
FIG. 1 is an illustration of a clamp.

Reference is made to FIG. 1, which illustrates a clamp in the form of a vise grip (also known as locking pliers) 110. The vice grip 110 includes an over-center mechanism. In the embodiment illustrated in FIG. 1, a first handle 120 is fixed to a first arm 122, and a second handle 130 is hinged to a second arm 132. The second arm 132 is also hinged to the first arm 122. One end of a lever (not shown) is hinged to the first handle 120 and the other end of the lever is hinged to the second handle 130. When the handles 120 and 130 are squeezed together, they move the lever over its center point and create a clamping force.

Figure 2A:
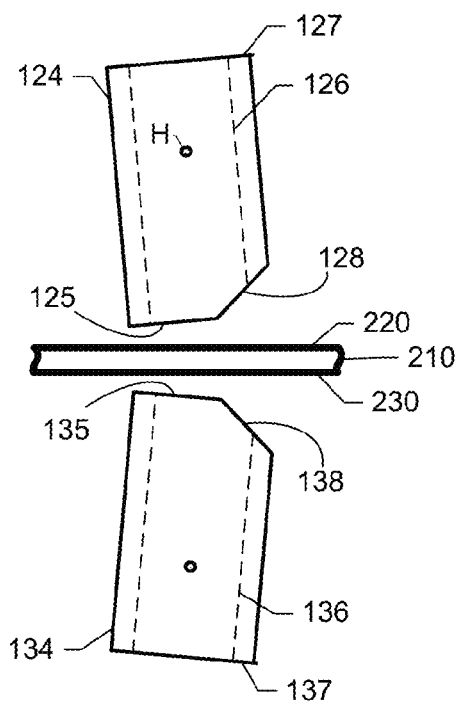
FIGS. 2A and 2B are illustrations of hinged clamping jaws having internal bores.
Figure 2B:
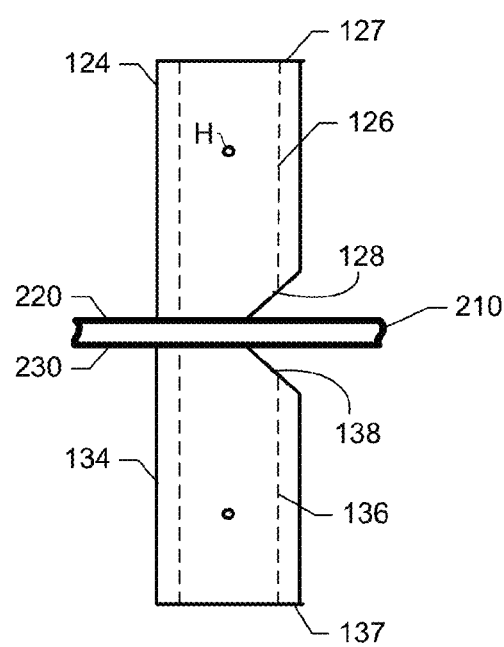

Additional reference is made to FIGS. 2A and 2B. The vice grip 110 further includes first and second clamping jaws 124 and 134 that provide contact surfaces 125 and 135. The first jaw 124 is elongated and is transversely hinged (at swivel point H) to the first arm 122. The first jaw 124 may hinge about an axis that is orthogonal to the first arm 122. In some embodiments, a steel pin swivel point provides positive flushness and indexing to part surface.

The second jaw 134, which may be elongated, is transversely hinged to the second arm 132. The second jaw 134 may hinge about an axis that is orthogonal to the second arm 132.

As the clamping jaws 124 and 134 are opened and closed with respect to a work part 210 (FIG. 2A), there is a change in angle between the contact surfaces 125 and 135 of the jaws 124 and 134 with respect to the work part 210. When the jaws 124 and 134 are clamped to the part 210, the contact surfaces 125 and 135 are parallel, regardless of part thickness and shape (FIG. 2B).

The first jaw 124 further includes a longitudinal internal bore 126 extending from the contact surface 125 to a non-contact (opposite) surface 127. Similarly, the second jaw 134 further includes a longitudinal internal bore 136 extending from the contact surface 135 to a non-contact (opposite) surface 137.

The clamping jaws 124 and 134 are hinged to maintain bore perpendicularity. That is, when the jaws 124 and 134 are clamped together against the part 210, each jaw 124 and 134 swivels so that its internal bore 126 and 136 is perpendicular to the surfaces 220 and 230 of the part 210 (as shown in FIG. 2B).

Figure 3A:
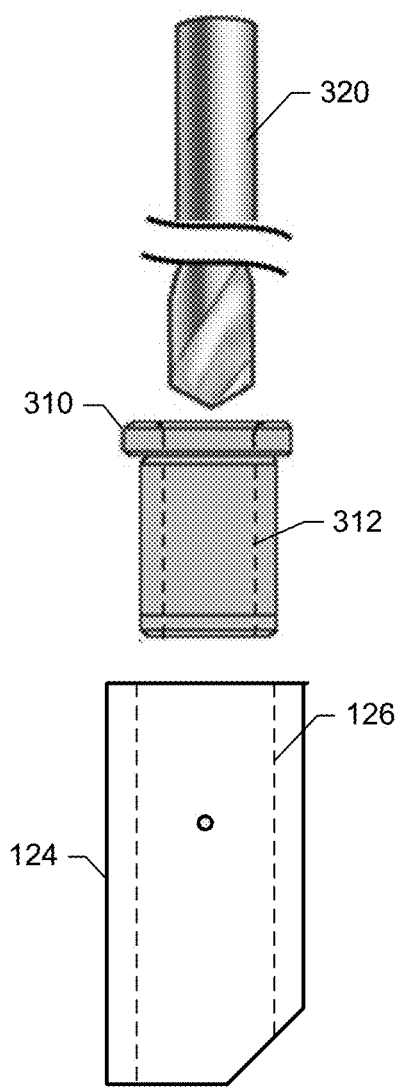
FIG. 3A is an illustration of a clamping jaw configured to receive a bushing and drill bit.

Additional reference is made to FIG. 3A. The bore 126 or 136 enables the jaw 124 or 134 to function as a drill guide. Consider the first jaw 124 illustrated in FIG. 3A. The non-contact surface 127 is configured so a bushing 310 may be detachably inserted in the bore 126 and a drill bit 320 may be inserted in a bore 312 in the bushing 310. Bushing bores 312 of different sizes accommodate drill bits 320 of different sizes.

The bore not being used as a drill guide may be corked to act as a drill stop. Both jaws 124 and 134 may have beveled portions 128 and 138 that provide an exit for chips created by drilling.

Figure 3B:
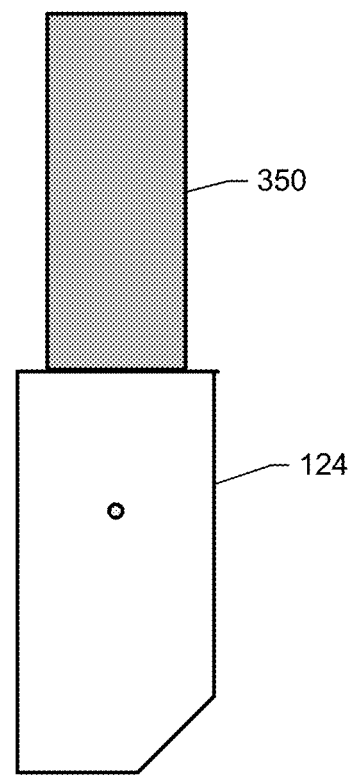
FIG. 3B is an illustration of a clamping jaw configured to receive an optical sighting device.

Additional reference is made to FIG. 3B. The non-contact surface 127 or 137 of a jaw 124 or 134 may also be configured to receive an optical sighting device 350 such as a bomb site. Consider the first jaw 124 illustrated in FIG. 3B. The optical sighting device 350 may be used to sight a drill mark on the part 210. The optical sighting device 350 may be used to center the bore 126 over the drill mark. In some embodiments, a bushing may be used as an adaptor for mounting the optical sighting device 350 in the bore 126.

In some embodiments, the first and second jaws 124 and 134 may have a similar construction. In the embodiment of FIG. 1, both jaws 124 and 134 are cylindrical. However, other embodiments are not so limited. Both jaws 124 and 134 may be designed to accommodate a contour, geometry or size of a specific part.

In some embodiments, a conventional knob 140 and screw (not shown) act on the lever to adjust the spacing of the jaws 124 and 134, and a lever 150 is used to push the handles 120 and 130 apart to unlock the jaws 124 and 134. In some embodiments, the conventional knob 140 is replaced with a torque knob.

Figure 4:
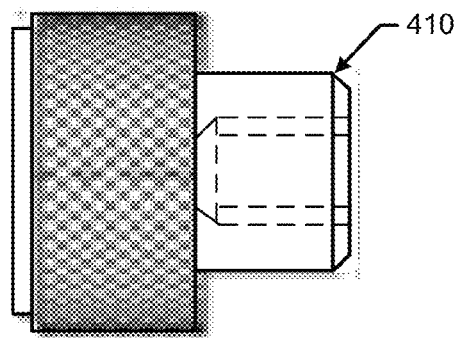
FIG. 4 is an illustration of a torque knob for the clamp.

FIG. 4 illustrates a torque knob 410. When turned in one direction (e.g., counterclockwise), the knob 410 may lock for positive retraction of the jaws. When turned in the opposite direction, the torque knob 410 causes the jaws to close until the target torque is exceeded. Once the target torque is exceeded, the torque knob 410 declutches and turns freely. For example, setting a target torque of 3-6 inch-lbs can adjust the clamping force between 10-125 lbs.

The torque knob 410 may be set to a torque value independent of the part thickness. For example, if the torque knob is set at 25 ft pounds, the same clamping force will be applied to a part having 0.25 inch thickness as a part having a 1.00 inch thickness.

Additional reference is made to FIG. 5, which illustrates a method of using the clamp 110 to drill a hole through a thin composite part. The part may be marked to indicate the location of the hole. For instance, the part may have cross hair indications on it as part of the detail fabrication or assembly manufacturing process.

At block 510, an optical sighting device such as a bomb sight is inserted into the bore of the back jaw. At block 520, the clamping jaws are opened and positioned over opposing surfaces of the part. At block 530, the torque knob is set to a target torque, and it is turned to close the jaw (without clamping the part).

At block 540, the optical sighting device is used to center the bore over the drill mark on the surface. For example, the cross hairs on the bomb sight, which indicate a drill center point, are aligned with the part's cross hairs prior to clamping.

At block 550, once the bore has been centered, the handles are closed. The jaws swivel to ensure that the bore is perpendicular to the surfaces of the part. The vise grip is now clamped to the part, with the bore centered over the drill mark and perpendicular to the part surface. The torque knob ensures that the target clamping force is not exceeded.

At block 560, the optical sighting device is removed from the bore, and a bushing is inserted. At block 570, a drill bit is inserted in the bushing and bore. If the bore has the same diameter of the drill, the bushing need not be inserted.

At block 580, the drill is used to create a hole in the part. During drilling, chips may be removed via the beveled ends of the clamping jaws.

The hinged clamping jaws ensure that bore perpendicularity and, therefore, drill bit perpendicularity are maintained throughout drilling. This enables the vice grip 110 to be used on different surface finishes, thicknesses and material types (e.g., composites materials and advanced chemical composition materials) during manufacturing, rework and repair operations.

The bushing allows for the rapid removal and replacement of drill bits and optical inserts. The rapid removal reduces labor hours and increases lifespan of the vice grip.

In embodiments that use a torque knob, the torque knob limits the clamping force during drilling, regardless of surface finish, thickness or material type of the part. The torque knob ensures that operators with stronger grips are prevented from applying a force that could damage a part.

A vice grip herein allows for clamping and drilling by a single operator. The use of a single operator reduces labor costs.

Figure 6:
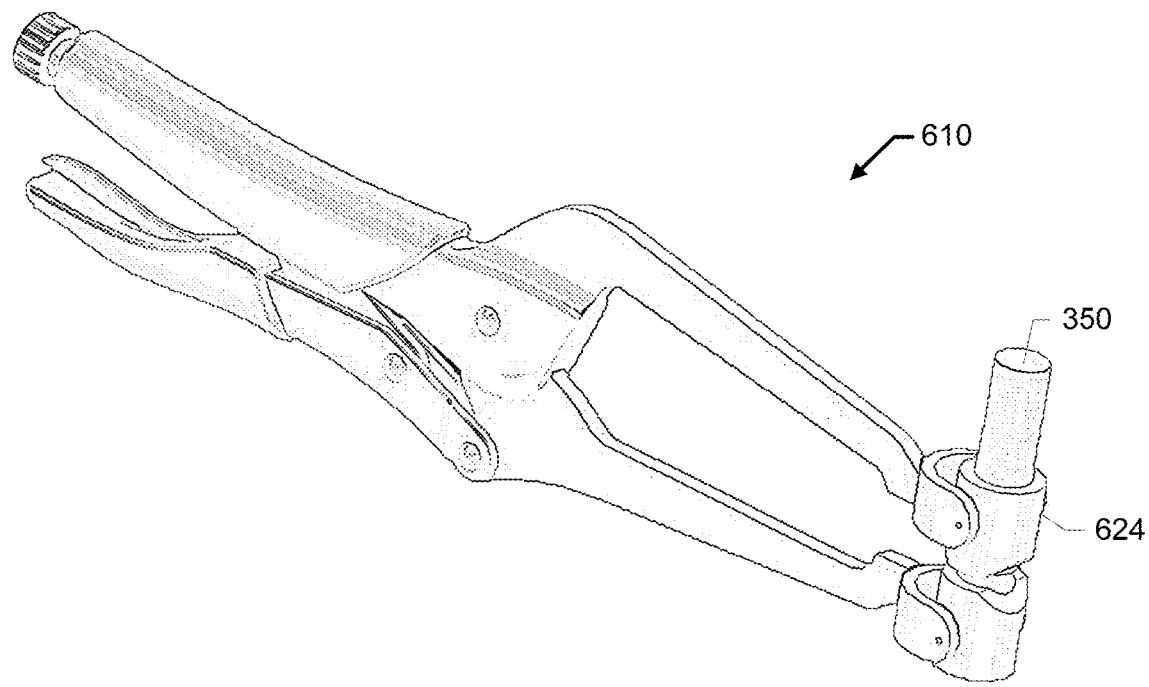
FIG. 6 is an illustration of a clamp.

Vice grips herein may have different jaw configurations. The different configurations allow access to narrow or wide openings in parts, different contours, and different thickness of materials. A deep throat vice grip is shown in FIG. 1. A needle nose vice grip 610 is shown in FIG. 6 (with a bomb sight 350 inserted in the bore of the first jaw 624).

A clamp herein is not limited to a drill guide. For instance, a clamp herein may be used for reaming, honing, countersinking and counter boring. A clamp herein may be used as holding fixtures for optical inspection inserts (manufacturing, maintenance and medical) and illumination devices.

A clamp herein is not limited to the clamping of parts made of composite materials. A part may be metallic or non-metallic (e.g., mineral structures such as stone, wood, plastics, glass).

A clamp herein may be used by the aircraft industry for the manufacturing, repair, rework and maintenance of composite parts. A clamp herein may be used in other fields, such as the automotive and marine industries, the petroleum industry (e.g., for pipeline manufacturing and maintenance), and the rail transport and delivery industry.

The invention claimed is:

1. A clamp comprising first and second jaws that provide contact surfaces, the first jaw being elongated and having a longitudinal bore configured for drilling and optical sighting, the first jaw transversely hinged to pivot the bore to maintain bore perpendicularity during clamping.

2. The clamp of claim 1, further comprising an optical sighting tool detachably mounted in the bore.

3. The clamp of claim 2, wherein the optical sighting tool includes a bomb sight.

4. The clamp of claim 1, further comprising a bushing detachably mounted in the bore.

5. The clamp of claim 1, further comprising a drill bit located within the bore.

6. The clamp of claim 1, further comprising a torque knob in a handle of the clamp, the torque knob limiting clamping force between the jaws.

7. The clamp of claim 1, wherein the clamp includes an over-center mechanism.

8. The clamp of claim 1, wherein the second jaw is also elongated and has a longitudinal bore, the second jaw transversely hinged to pivot its bore to maintain bore perpendicularity; wherein both jaws are transversely hinged so their longitudinal bores maintain alignment during clamping.

9. The clamp of claim 8, wherein the jaws are cylindrical, wherein first ends of the cylindrical jaws provide the contact surfaces.

10. The clamp of claim 9, wherein the first ends also have beveled portions.

11. A drill guide comprising a vice grip with first and second arms, and first and second cylindrical jaws having longitudinal bores, opposing ends of the jaws providing sole contact surfaces, the first and second cylindrical jaws transversely hinged to the first and second arms so the longitudinal bores maintain bore perpendicularity and alignment during clamping.

12. The drill guide of claim 11, wherein each longitudinal bore is configured for drilling and optical sighting.

13. The drill guide of claim 11, wherein the vice grip further has a first handle fixed to the first arm, and a torque knob in the handle for adjusting spacing of the jaws, the torque knob limiting clamping force between the jaws.

14. The drill guide of claim 11, wherein the opposing ends also have beveled portions.

15. The drill guide of claim 11, further comprising an optical sighting tool detachably mounted in the bore.

16. The drill guide of claim 11, further comprising a drill bit located within the bore.

17. The drill guide of claim 11, wherein each bore extends from the contact surface of its cylindrical jaw to an opposite surface of its cylindrical jaw.

18. The drill guide of claim 11, wherein the first and second arms are hinged together; and wherein the longitudinal bores maintain axial alignment during clamping.

19. A method of drilling a thin composite part that is rigid and susceptible to chipping while being drilled, the method comprising:
- clamping the part with clamp jaws that are pivotable, while pivoting a longitudinal internal bore in one of the jaws to ensure that the longitudinal bore is perpendicular to the surfaces of the part;
- inserting a drill bit in the bore; and
- using the drill bit to create a hole in the part.

20. The method of 19, further comprising using a torque knob to maintain clamping force between the jaws as the drill bit is being used.

\* \* \* \* \*